United States Patent [19]

Meermans

[11] Patent Number: 4,860,967
[45] Date of Patent: Aug. 29, 1989

[54] MAGNETIC-TAPE CASSETTE AND TAPE-PRESSURE MEMBER FOR USE IN SUCH A CASSETTE

[75] Inventor: Matheus J. M. Meermans, As, Belgium

[73] Assignee: U.S. Philips Corporation, New York, N.Y.

[21] Appl. No.: 142,081

[22] Filed: Feb. 4, 1987

[30] Foreign Application Priority Data

Feb. 20, 1986 [NL] Netherlands .......................... 8600423

[51] Int. Cl.$^4$ ............................................ G11B 23/00
[52] U.S. Cl. ................................ 242/199; 360/130.32; 360/130.33
[58] Field of Search .............................. 242/198, 199; 360/130.3, 130.33, 132

[56] References Cited

U.S. PATENT DOCUMENTS 4,087,845 5/1978 Saito ................................ 360/132 X
4,293,885 10/1981 Shirako et al. .................. 360/132 X
4,573,095 2/1986 Bordignon ........................ 242/198 X Primary Examiner—David Werner
Attorney, Agent, or Firm—David R. Treacy

[57] ABSTRACT

In a magnetic-tape cassette the housing comprises a peripheral wall (7) with an opening (7a) for the passage of a magnetic head (27). The cassette is provided with a tape-pressure (19) comprising a pressure element (22) which near the opening (7a) lies against the back of the magnetic tape (8). The tape-pressure member (19) comprises a substantially U-shaped leaf spring (21) having an elongate main portion (20) which carries the pressure element (22) near its center. The main portion (20) comprises two elongate embossments (20a, 20b) whose crests extend substantially parallel to the longitudinal axis of the main portion (20). The crests of the embossments (20a, 20b) of the leaf spring (21) abut against supporting elements (25, 26), which are situated inside the housing at the side which is remote from the opening (7a).

4 Claims, 2 Drawing Sheets

MAGNETIC-TAPE CASSETTE AND TAPE-PRESSURE MEMBER FOR USE IN SUCH A CASSETTE

BACKGROUND OF THE INVENTION

The invention relates to a magnetic-tape cassette comprising a housing with peripheral walls, of which one peripheral wall is formed with an opening for the passage of a magnetic head mounted on a magnetic-tape apparatus, tape-guide elements for guiding the magnetic tape in the cassette across said opening, a tape-pressure member comprising a pressure element which abuts against the back of the magnetic tape near said opening. The pressure member is mounted on a substantially U-shaped leaf spring comprising a main portion elongated in the direction of tape transport on which the pressure element is arranged near the center. The leaf spring presses the pressure element against the tape and against the magnetic head once the magnetic head has been introduced through the opening. At the side which is remote from the opening, near the ends of its main portion, the spring abuts against two supporting elements provided in the housing.

Such a cassette is known from U.S. Pat. Specification No. 4,392,169 and is generally referred to as a "Compact Cassette". In this known cassette the leaf spring near the ends of the flat main portion acts against upright pins on one of the cassette main walls on opposite sides of the opening in the peripheral wall. The pressure element serves to ensure that the head face of a magnetic-tape head which projects into the opening during operation is properly in contact with the magnetic tape which moves past the head face. The front side of the pressure element which faces the opening extends at least substantially parallel to said peripheral wall when the cassette is inoperative. As the pressure element is made of an elastically compressible material such as felt the pressure element, if the magnetic head is slightly tilted relative to said peripheral wall, can adapt itself slightly to this tilted position. However, if the tilting angle of the magnetic head exceeds a specific value and/or if the elasticity of the pressure element has degraded as a result of ageing, the pressure element is no longer capable of pressing the magnetic tape uniformly against the head face of the magnetic head manner over the entire surface area, so that one of the tape halves is not fully in contact with the head. This results in a degraded reproduction and/or recording of the signal tracks situated in this tape half. It has been found that these problems occur in particular in magnetic-tape apparatuses of the "reverse" type, where the tape is moved past the head in two opposite directions for recording and/or reproduction and where the head is rotated through 180° when the tape-transport direction is changed. If such a head is tilted, which happens frequently in practice as a result of the comparatively intricate method of mounting the head, the part of the head face where the two air gaps of the head ducts terminate may be in poor contact with the magnetic tape in both functional positions of the head.

From U.S. patent specification No. 4,293,885 it is known to provide the leaf spring for a tape pressure member in a magnetic tape cassette with convex embossments which abut against pins in the cassette, allowing the leaf spring to be tilted to adapt its position to the position of a tilted magnetic head. However, the convex embossments necessitate an accurate positioning of the leaf spring relative to the pins so that a high precision must be observed in the manufacture of this known cassette. Therefore, the construction of this cassette is comparatively expensive and less suitable for use in compact cassettes, which are produced in large quantities at a comparatively low price.

SUMMARY OF THE INVENTION

It is the object of the invention to provide a magnetic-tape cassette of the type defined in the opening paragraph, in particular a compact cassette suitable for mass production, with a tape-pressure member which is capable of effectively adapting its position to the position of the magnetic head.

To this end the invention is characterized in that the leaf spring is formed with two elongate embossments whose crests extend substantially parallel to the longitudinal axis of the main portion, which is parallel to the direction of tape transport and the leaf spring abuts against the supporting elements at the location of the crests.

The elongate embossments of the tape-pressure member abut against the supporting elements, so that even when the main portion of the leaf spring has shifted, for example in the case of tolerance in the distance between the supporting elements, the leaf spring always abuts against the supporting elements with its embossments. Also after a movement of the magnetic head against the tape and deflection of the main portion, causing the ends of the main portion to be shifted at the location of the supporting elements, the embossments still lie against the supporting elements. This has the advantage that the height of the crest of each embossment relative to the main portion is constant over the entire length, so that in the case of shifting over the supporting element the pressure element cannot pivot about an axis perpendicular to the cassette main walls and, moreover, the limbs of the U-shaped leaf spring cannot become stuck between the supporting elements. The embossments can be formed simply and cheaply on the customary leaf springs used in compact cassettes and do not require an adaptation of the generally fully automatic assembly machines by means of which such cassettes are assembled.

Suitably, a tape-pressure member for use in a cassette in accordance with the invention is characterized in that the embossments extend from the ends of the main portion towards the center of the main portion. Thus, the embossments extend from the limbs of the U-shaped leaf spring, which are situated adjacent the main portion. Since these limbs, which are situated adjacent the supporting elements, limit a displacement of the leaf spring over the supporting elements, the main portion still lies with the embossments against the supporting elements even in extremely shifted positions.

Another preferred embodiment of a tape-pressure member is characterized in that the embossments are substantially V-shaped in a cross-sectional view of the main portion. As a result of the V-shape the leaf spring constitutes a kind of knife edge fulcrum, which ensures an effective adaptation of the position of the leaf spring to the position of the magnetic head.

Embodiments of the invention will be described in more detail, by way of example, with reference to the accompanying drawings.

DESCRIPTION OF THE PREFERRED EMBODIMENT

Figure 1:
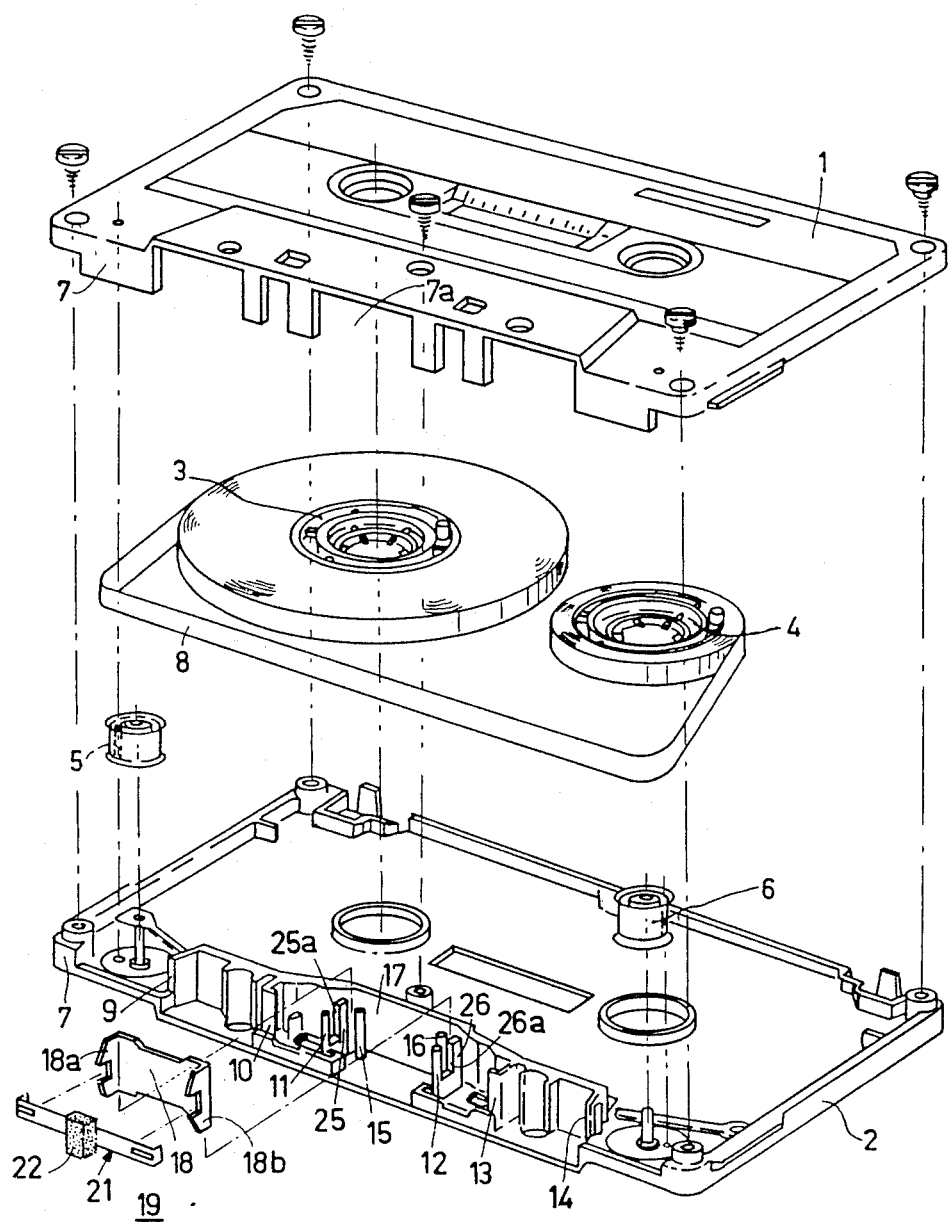
FIG. 1 is an exploded perspective view of a magnetic-tape cassette in accordance with the invention.

A magnetic-tape cassette of the type shown in FIG. 1 is generally referred to by the name of "Compact Cassette". Such a cassette is described in U.S. Pat. Specification No. 3,394,899. This cassette generally comprises two housing sections 1 and 2 and two reel hubs 3 and 4 containing a length of magnetic tape 8. Inside the cassette the magnetic tape 8 is guided from the tape rolls on the hubs 3 and 4 over two guide rollers 5 and 6, a part of the magnetic tape extending parallel to a peripheral side 7 of the cassette, hereinafter referred to as front. In the front 7 a plurality of openings are formed, of which a central opening 7a is intended for introducing a magnetic head of a magnetic-tape apparatus into the cassette housing comprising the two housing halves 1 and 2. During tape transport the part of the magnetic tape which extends in a tape transport direction substantially parallel to the front 7 between the guide rollers 5 and 6 is guided also by tape-guide elements 9 to 14 are arranged on the bottom of the housing section 2 near the front 7. As is shown in FIG. 1, the bottom of the housing section 2 further carries two pins 15 and 16 behind the opening 7a, which pins in comparison with the front 7 are situated at a short distance before an upright wall 17 on the housing section 2. A U-shaped shielding element 18 is situated between the upright wall 17 and the pins 15 and 16 and comprises limbs 18a, 18b which extend towards the front 7 and which adjoin the sides of the pins 15 and 16 which are remote from each other. The free ends of the limbs 18a, 18b are formed with rectangular recesses through which a tape-pressure member 19 extends.

Figure 2:
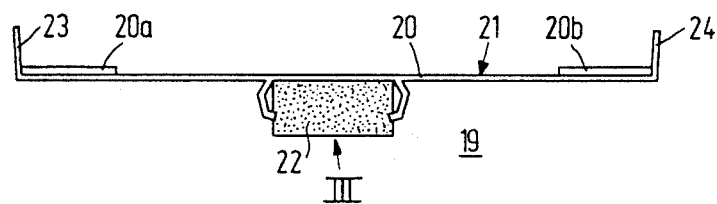
FIG. 2 is an enlarged-scale plan view of a tape-pressure member used in the cassette shown in FIG. 1.
Figure 3:
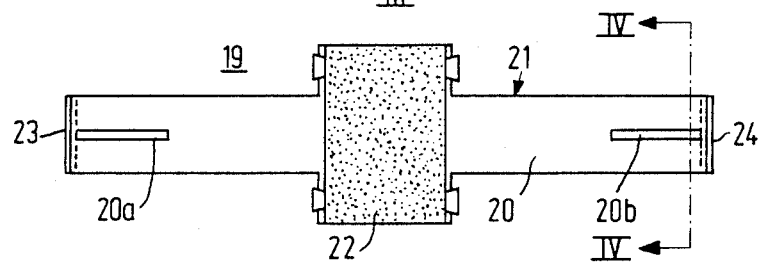
FIG. 3 is a view of the tape-pressure member taken on the arrow III in FIG. 2.
Figure 4:
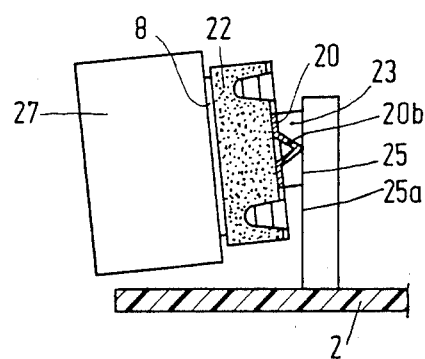
FIG. 4 is a partly sectional view taken on the lines IV—IV in FIG. 3, showing the tape-pressure member positioned against the supporting element, and a magnetic head which extends through the opening in the peripheral wall and which has tilted the tape-pressure member.

The tape-pressure member 19 is also shown in FIGS. 2 to 4. The horizontal sides of the recesses in the limbs 18a, 18b thus support the edges of a main portion 20 of the tape-pressure member 19. This main portion 20 forms part of a substantially U-shaped leaf spring 21 on which a pressure element 22 is clamped near the center of the main portion 20. The pressure element 22 is made of an elastically compressible material such as felt or foam rubber. In the assembled condition the main portion 20 near the limbs 23 and 24 of the leaf spring 21 is situated between the tape-guide elements 11 and 12 and at a short distance from the supporting elements 25 and 26 arranged behind said tape-guide elements. These supporting elements are also arranged on the bottom of the housing section 2 and have upright front edges 25a and 26a respectively, which at least over the greater part extend substantially perpendicularly to the bottom of the housing 2, as is shown in FIG. 4. The limbs 23 and 24 adjoin the sides of the supporting elements 25 and 26 which are remote from each other.

In the assembled condition the tape-pressure member 19 situated with some clearance between the front edges 25a and 26a and the adjacent sides of the tape-guide elements 11 and 12 respectively, the distance between the front edge and the adjacent guide element being such that the pressure element 19 can perform a pivotal movement towards a position as shown in FIG. 4. For this purpose the main portion 20 is provided with elongate embossments 20a, 20b near its ends, the crests of said embossments, which are substantially V-shaped in cross-section, extending substantially parallel to the longitudinal axis of the main portion 20. The embossments 20a, 20b extend from the limbs 23 and 24 and respectively towards the centre of the main portion and have such a length that even after a displacement of the leaf spring 21 in the direction of the longitudinal axis of the main portion the crests of the embossments 20a, 20b always abut against the upright edges 25a and 26a respectively. Thus, it is not necessary to observe a particularly high degree of precision in manufacturing the leaf spring 21 and positioning the supporting elements 25 and 26. Also when a magnetic head 27 extends through the opening 7a and, as is shown in FIG. 4, the magnetic tape 8 is pressed against the head face of the magnetic head 27 by the pressure element 22, so that the main portion 20 of the leaf spring 21 slightly deflected, the embossments 20a and 20b still rest against the upright edges 25a and 26a respectively.

FIG. 4 shows how the tape-pressure member 19 can tilt about the crests of the embossments 20a and 20b respectively. The latter situation may occur when a magnetic head 27 is passed through the opening 7a, which head is slightly tilted relative to the bottom of the housing section 2. Even in such a tilted position of the magnetic head the tape-pressure member 19 still ensures that the pressure element 22 presses the tape 8 uniformly against the head 27 over at least substantially the entire width. In this respect it is advantageous that each time when a magnetic head 27 is introduced the position of the pressure element 22 is adapted to the position of the head 27. Thus, the magnetic-tape cassette in accordance with the invention comprises a self-adjusting tape-pressure member which ensures that the head face of the head 27 is in proper contact with the tape 8 during recording and/or reproduction.

A further advantage of the cassette in accordance with the invention is that the leaf spring 21 is constructed as a standard leaf spring which is formed with two additional embossments 20a and 20b in comparison with the normally used version. This has the advantage that the tape-pressure member 19 can be manufactured substantially without any additional costs. Moreover the machines utilized for assembling the cassette need not be adapted.

What is claimed is:

1. A magnetic-tape cassette comprising:
   a housing having a plurality of peripheral walls and two supporting elements, one of said walls having an opening therethrough adapted for the passage of a magnetic head mounted on a magnetic-tape apparatus,
   a length of magnetic tape disposed in the housing, and tape guide elements for guiding a portion of said length of tape in a transport direction across said opening,
   a tape pressure member comprising a pressure element abutting against the back of the magnetic tape near said opening, and a substantially U-shaped leaf spring having a main portion elongated in said transport direction, said pressure element being arranged near the center of said main portion, said leaf spring being arranged for pressing said pressure element against the length of tape so as to press the tape against a magnetic head which has been introduced through the opening, at a side of the leaf spring remote from the opening said leaf spring abutting against said two supporting elements at locations near the ends of said main portion, characterized in that said leaf spring comprises two elongate embossments having elongated crests extending substantially parallel to said tape transport direction, said locations at which the spring abuts the supporting elements being respective locations along said crests.

2. A cassette as claimed in claim 1, characterized in that said elongated embossments have a substantially V-shaped cross section transverse to said transport direction.

3. A magnetic-tape cassette comprising:

a housing having a plurality of peripheral walls and two supporting elements, one of said walls having an opening there through adapted for the passage of a magnetic head mounted on a magnetic-tape apparatus, a length of magnetic tape disposed in the housing, and tape guide elements for guiding a portion of said length of tape in a transport direction across said opening, a tape pressure member comprising a pressure element abutting against the back of the magnetic tape near said opening, and a substantially U-shaped leaf spring having a main portion elongated in said transport direction and two limbs which are legs of the U-shaped spring, said main portion extending between said limbs, said pressure element being arranged near the center of said main portion, said leaf spring being arranged for pressing said pressure element against the length of tape so as to press the tape against a magnetic head which has been introduced through the opening, at a side of the leaf spring remote from the opening said leaf spring abutting against said two supporting elements at locations near the ends of said main portions, characterized in that said leaf spring comprises two elongate embossments having elongated crests extending substantially parallel to said tape transport direction, said locations at which the spring abuts the supporting elements being respective locations along said crests, said embossments extending respectively from ends of the main portion adjacent said limbs toward the center of the main portion.

4. A tape pressure member for a magnetic-tape cassette comprising:

a housing having a plurality of peripheral walls and two supporting elements, one of said walls having an opening there through adapted for the passage of a magnetic head mounted on a magnetic-tape apparatus, and a length of magnetic tape disposed in the housing, and tape guide elements for guiding a portion of said length of tape in a transport direction across said opening, said tape pressure member comprising a pressure element abutting against the back of the magnetic tape near said opening, and a substantially U-shaped leaf spring having a main portion elongated in said transport direction and two limbs which are legs of the U-shaped spring, said main portion extending between said limbs, said pressure element being arranged near the center of said main portion, said leaf spring being arranged for pressing said pressure element against the length of tape so as to press the tape against a magnetic head which has been introduced through the opening, at a side of the leaf spring remote from the opening said leaf spring abutting against said two supporting elements at locations near the ends of said main portions, characterized in that said leaf spring comprises two elongate embossments having elongated crests extending substantially parallel to said tape transport direction, said embossments having a substantially V-shaped cross section transfers to the direction of tape transport, said locations at which the spring abuts the supporting elements being respective locations along said crests said main portions extending between two limbs which are legs of the U-shaped leaf spring, and said embossments extending respectively from ends of the main portion adjacent said limbs toward the center of the main portion.

* * * * *